(12) United States Patent  (10) Patent No.: US 8,915,134 B2
Giovanoni et al.  (45) Date of Patent: Dec. 23, 2014

(54) INSTRUMENT FAULT INDICATION APPARATUS

(75) Inventors: Daniel Patrick Giovanoni, Norton, MA (US); Conor Padraic Beote, Brighton, MA (US); Jean-Marc Mahieu, Saint Pierre du Regard (FR); Denis Vital, Montsecret (FR)

(73) Assignee: Dresser, Inc., Addison, TX (US)

( * ) Notice: Subject to any disclaimer, the term of this patent is extended or adjusted under 35 U.S.C. 154(b) by 466 days.

(21) Appl. No.: 13/252,865

(22) Filed: Oct. 4, 2011

(65) Prior Publication Data

US 2013/0081480 A1 Apr. 4, 2013

(51) Int. Cl.
    G01F 23/00 (2006.01)
    G01F 23/30 (2006.01)
    G01F 23/56 (2006.01)
    G01F 23/62 (2006.01)
    G01F 25/00 (2006.01)

(52) U.S. Cl.
    CPC ............ G01F 23/62 (2013.01); G01F 25/0061 (2013.01)
    USPC ................. 73/308; 73/305; 73/290 R; 73/313

(58) Field of Classification Search
    CPC ....... G01F 23/38; G01F 23/284; G01F 23/32; G01F 23/36
    USPC .......................... 73/290 R, 313–317, 305, 308
    See application file for complete search history.

(56) References Cited

U.S. PATENT DOCUMENTS

| | | | |
|---|---|---|---|
| 4,019,363 A * | 4/1977 | Sanford | 73/1.73 |
| 5,021,619 A * | 6/1991 | Hutchinson | 200/81.9 M |
| 5,767,419 A * | 6/1998 | Hutchinson | 73/861.74 |
| 6,202,487 B1 * | 3/2001 | Urias et al. | 73/309 |
| 6,373,261 B1 | 4/2002 | Kielb et al. | |
| 6,976,394 B2 | 12/2005 | Kleinen et al. | |
| 8,297,111 B2 * | 10/2012 | Heinrich et al. | 73/54.26 |
| 2002/0008659 A1 | 1/2002 | Fehrenbach et al. | |
| 2004/0074297 A1 * | 4/2004 | Sato | 73/313 |
| 2006/0096369 A1 * | 5/2006 | Fling et al. | 73/314 |
| 2013/0104844 A1 * | 5/2013 | Noh et al. | 123/403 |

OTHER PUBLICATIONS

Emerson Process Management, "DL3 Digital Level Transmitter," Product Bulletin, Sep. 2008, 12 pages.

(Continued)

*Primary Examiner* — Lisa Caputo
*Assistant Examiner* — Jonathan Dunlap
(74) *Attorney, Agent, or Firm* — Paul, Frank + Collins P.C.

(57) ABSTRACT

A measuring system is disclosed that may include a sensing module that provides a response to a measured quantity, a first mechanical transducer that provides an output signal proportional to the measured quantity, a conversion device that converts the output signal to a second output signal, and a sensor that detects the second output signal and generates an instrument reading within an instrument range of output signals. A bias assembly may forces a second mechanical transducer to provide the second output signal that is detected by the sensor and which generates an instrument reading outside of the specified instrument range when the mechanical transducer is disconnected from the conversion device. A level detector is also disclosed that may include a displacer assembly, a torque rod coupled to the displacer assembly and connected to a magnet, and a non-contact sensor that detects displacement of the magnet assembly within an instrument range.

27 Claims, 5 Drawing Sheets

(56) References Cited

OTHER PUBLICATIONS

Dresser Masoneilan, "12400 Series Digital Level Transmitter/Controller," Specification Data, Jan. 15, 2010, 20 pages.
Dresser Masoneilan, "Model 12300 Digital Level Transmitter/Controller," Instruction No EU 3000, Mar. 27, 2000, 46 pages.
Foxboro Eckardt GmbH, "Transmitter for Liquid Level, Interface and Density," Feb. 6, 2001, 8 pages.
Magnetrol, "Eclipse Enhanced Model 705 With Foundation Fieldbus™ Digital Output," Foundation Fieldbus™ Operating Manual, Oct. 21, 2009, 56 pages.

* cited by examiner

INSTRUMENT FAULT INDICATION APPARATUS

TECHNICAL FIELD

The subject matter disclosed herein relates to mechanisms and methods for indicating a fault condition in an instrument and more particularly mechanisms and methods for indicating a fault condition in a measurement system that includes a mechanical linkage in a transmitting element.

BACKGROUND

Efficient industrial processes require the measurement and control of various of parameters such as temperatures, pressures, levels and flow rate. Instruments are used to effect those measurements. A typical instrument has three components; a sensing element; a transmitting element and an output or indicating element.

Sensing elements respond directly to the measured quantity, producing a response such as displacement or motion, pressure, or electrical signal. The response is transmitted by a transmitting element which may include linkages, tubing, wiring that provides an output signal. The transmitting elements may comprise one or more transducers. Among the types of transducers that are commonly used are mechanical transducers that convert one form of energy into other form that can be measured easily. For example, a linear force may be converted to torsion, and torsion may be converted to displacement. The output signal of the transmitting element is received by the output or indicating element that displays a representation of the output signal. For example, displays may include, among other devices, a dial with a needle indicator, or digital displays.

A level transmitter or controller (e.g. Dresser Masoneilan 12400 Series Digital Level Transmitter/Controller) is an example of such an instrument. Level transmitters are used to measure the level of a liquid in a reservoir or vessel and may be incorporated in control systems that control industrial processes in a variety of industries. Level transmitters or controllers may incorporate two-wire field devices coupled to a control room using a two-wire process control loop. Two-wire devices receive power from a process control loop, and communicate over the process control loop. Some instruments use Highway Addressable Remote Transducer (HART®) protocol for sending and receiving digital information across analog wires between the instrument and control or monitoring systems. An exemplary level transmitter or controller may comprise a displacer (sensing element) that is immersed in the liquid. The displacer is coupled to a torque tube. A change in liquid level varies the net weight of the displacer, increasing or decreasing a torsion load on a torque tube and torque rod by an amount directly proportional to the change in liquid level. The torque rod is attached to a magnet assembly comprising a rotating beam with an attached magnet. The rotation of the torque rod results in the angular displacement of the magnet assembly. The displacement of the magnet modifies the magnetic field surrounding a non-contact sensor, producing a signal proportional to the level in the vessel. The signal may be provided to an output readout component that provides a measure of the level of the liquid. These instruments are rugged, reliable and accurate. [hart is example any communication works]

In rare situations the mechanical linkage between the torque rod and the rotating beam may be disconnected. When that happens, it is possible for the beam and magnet to be in a position where the non-contact sensor provides an erroneous but plausible output. This possibility creates a problem when the instrument is used as a component of a safety instrumented systems (SIS) that is used to achieve or maintain a safe state of a process when unacceptable or dangerous process conditions are detected. The consequences of an erroneous but plausible process condition may be severe. The quality or dependability of an SIS is conveyed by safety integrity levels ratings (SILs). There are four discrete integrity levels associated with SILs. The higher the SIL level, the lower the probability of failure on demand for the safety system and the better the system performance. In some cases, an instrument having a mechanical connection may not be SIL 2 rated unless the instrument provides a way to detect a broken mechanical connection. For example, in the case of Dresser Masoneilan 12400 Series Digital Level Transmitter/Controller, the instrument may not be SIL 2 rated unless there is a way to detect when the magnet assembly is disconnected from the torque rod.

BRIEF DESCRIPTION OF THE INVENTION

According to one aspect of the invention, a measurement system is disclosed. The measuring system includes a sensing module that provides a response to a measured quantity. The measurement system also includes a first mechanical transducer that provides a first output signal proportional to the measured quantity and a second mechanical transducer connected to the first mechanical transducer that provides a second output signal associated with the measured quantity. A sensor that detects the second output signal and generates a reading within a specified instrument range of output signals is also included in the measurement system. The measurement system also includes a bias assembly that forces the second mechanical transducer to provide a second output signal that is detected by the sensor as a reading outside of the specified instrument range when first mechanical transducer is disconnected from the second mechanical transducer. The bias assembly provides a way to detect and indicate when the first mechanical transducer is disconnected from the second mechanical transducer.

According to another aspect of the invention, a level detector is disclosed. The level detector includes a displacer assembly, a torque rod coupled to the displacer assembly; a magnet assembly connected to the torque rod; and a non-contact sensor that detects displacement of the magnet assembly within an instrument range. The level detector also includes a bias assembly that displaces the magnet assembly beyond the instrument range when the magnet assembly is disconnected from the torque rod. The bias assembly provides a way to detect and indicate when the connection between the magnet assembly and the torque rod are disconnected.

In yet another aspect of the invention, the bias assembly in the level detector may include a weight, a compression spring or a torsion spring attached to the magnet assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Reference now will be made in detail to embodiments of the invention, one of or more example of which are illustrated in the drawings. Each example is provided by way of explanation of the invention, not limitation of the invention. In fact, it would be apparent to those skilled in the art that various modifications and variations can be made present invention without departing from the scope or spirit of the invention. For instance, features illustrated and described as part of one embodiment can be used with another embodiment to yield a still further embodiment. Thus, it is intended that the present invention, covers such modifications and variations as come within the scope of the appended claims and their equivalents.

Figure 1:
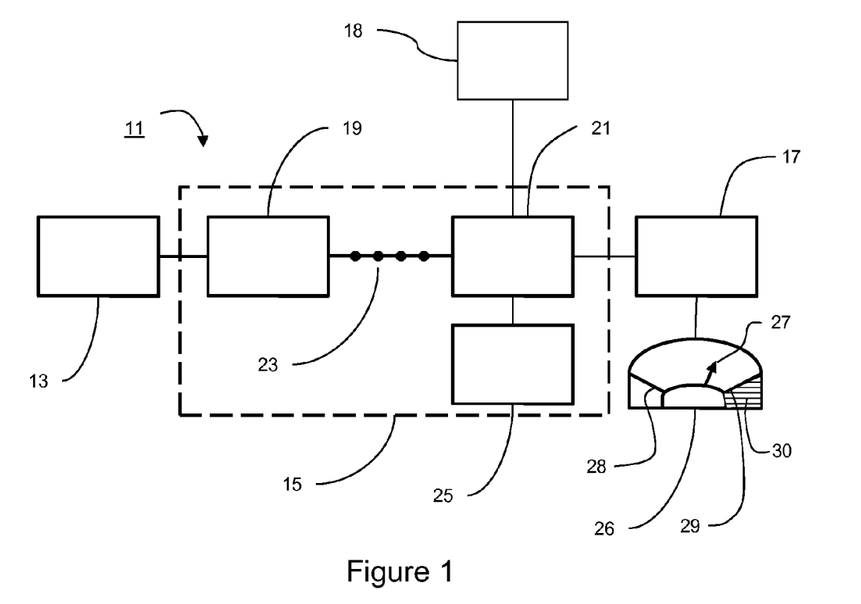
FIG. 1 is a block diagram of an embodiment of an instrument with a fault indication mechanism according to one embodiment of the present invention.

FIG. 1 is a block diagram of a measuring system 11 according to one embodiment of the invention. In the measuring system 11 a sensing element 13 is coupled to a transmitting element 15. The transmitting element 15 is in turn coupled to an output indicating elements 17. Additionally, the transmitting element 15 may provide a signal to a control system 18, which controls a process. The transmitting element 15 includes a first transducer 19 which may be a mechanical transducer and a second transducer or conversion device 21 which may be a mechanical transducer. The first transducer 19 and the second transducer 21 are connected through a mechanical linkage 23. Although in the preceding description only two transponders or conversion devices are described, in other embodiments there may be a plurality of transponders that are sequentially coupled. The transmitting element 15 also includes a biasing element or assembly 25 that forces the second transducer 21 to provide a predetermined output signal to the output indicating element 17 when the mechanical linkage 23 is severed or disconnected. The output or indicating element 17 may include a display 26. The display 26 may be a digital display or an analog display with an indicator 27 that travels between a lower value 28 and an upper value 29. The range between the lower value 28 and upper value 29 of a quantity that an instrument is designed to measure is the instrument range. The display 26 may also include indicia 30 indicating a value outside of the instrument range. In operation, the biasing element or assembly 25 forces the output or indicating element 17 to indicate a value outside of the instrument range (such as for example within the indicia 30 showing a value outside of the instrument range in a display 26) when the mechanical linkage 23 is severed or disconnected. For example, a level transmitter or controller may have a lower value of 0% and an upper value of 120% (the value may exceed a 100% under certain conditions) an indication of a fill level of a vessel. In this example the instrument range would be between 0 and 120%. A value outside the instrument range may be a value significantly over the maximum value, for example, 150%.

Figure 2:
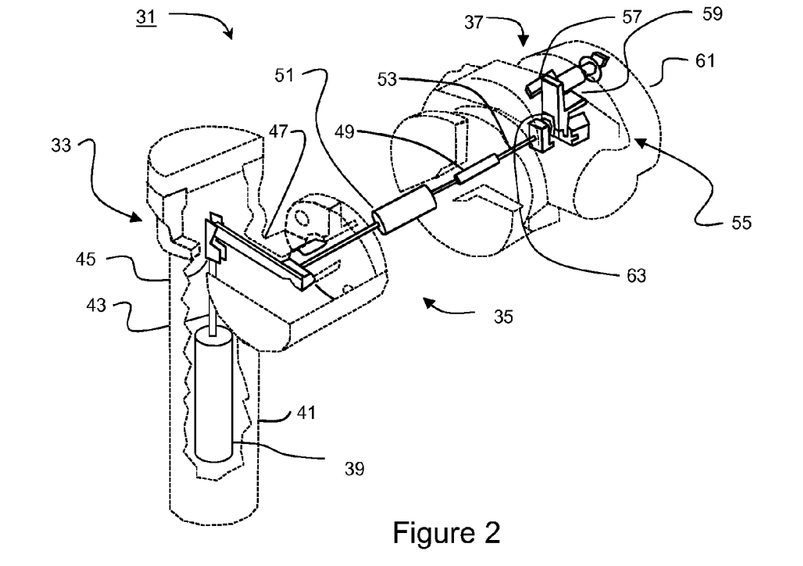
FIG. 2 is a perspective view of an instrument with a fault indication mechanism as implemented in an illustrative level transmitter or controller according to one embodiment of the present invention.

FIG. 2 illustrates another embodiment implemented in a level transmitter or controller 31. The level transmitter or controller 31 includes a displacer assembly 33, a transmitter mechanism assembly 35 and an instrument assembly 37. The displacer assembly 33 includes a displacer 39 with an extension rod 43 connected to a displacer hanger 45 that is in turn connected to a torque arm 47. The displacer assembly 33 is an example of a sensing element 13 as illustrated in FIG. 1. The transmitter mechanism assembly 35 may include torque tube 49, surrounded by a torque tube housing 51 and incorporating a torque rod 53. The torque rod 53 is connected to a sensor assembly 55. The sensor assembly 55 includes a biasing mechanism 57, a noncontact sensor 59 (such as for example, a Hall effect sensor) and an output display 61. The sensor assembly 55 may additionally provide an output signal to a control system. In operation, the displacer assembly 33 is disposed in contact with liquid in a reservoir or vessel. When the liquid level changes the relative weight (vertical force) external by the displacer 39 on the torque arm 47 will increase or decrease depending on the change. The torsion on the torque tube 49 will increase or decrease by an amount proportional to the change in the liquid to the change in liquid level. The torsion on the torque tube 49 causes a rotation of the torque rod 53, which in turn causes the magnet assembly 63 to rotate. The displacement of the magnet assembly 63 modifies the magnetic field surrounding the noncontact sensor 59 producing an analog signal proportional to the level in the reservoir or vessel. If the torque rod 53 is disconnected from the magnet assembly 63 the biasing mechanism will force the magnet assembly to be displaced a predetermined amount, and will produce a signal that is outside of the instrument range. In this embodiment, a number of devices can be characterized as transponders or conversion devices. For example, the displacer 39 converts a change in buoyancy to a force that is applied to the torque arm 47. The torque arm 47 converts the force applied by the displacer 39 to a moment or torque on the torque rod 53. Magnet assembly 63 converts the torque applied by the torque rod 53 into a change in the magnetic field detected by the non-contact sensor 59.

The level transmitter or controller 31 may be coupled to a control system such as control system 18 in FIG. 1. The non-contact sensor provides an analog output signal proportional to the displacement of the magnet assembly or the level in the reservoir or vessel. The analog signal is converted into an error-free digital signal that can be processed by an on-board micro-controller. After the signal has been processed, the digital result is converted to a 4-20 mA analog output signal. A HART digital signal is superimposed to the 4-20 mA analog output signal. The instrument is powered through the 2-wire series loop over a process control loop to the process control system, to enable the monitoring or control of a process. The process control system may include a fault indicator that provides a fault signal when that magnet assembly 63 is displaced beyond the instrument range. Although in this example, communication Other technologies are available to communicate the analog output signal to the control system 18, such as for example, radio frequency, fiber optic, and electric line telemetry, among others may be used to transmit the output signal to the control system 18.

Figure 3:
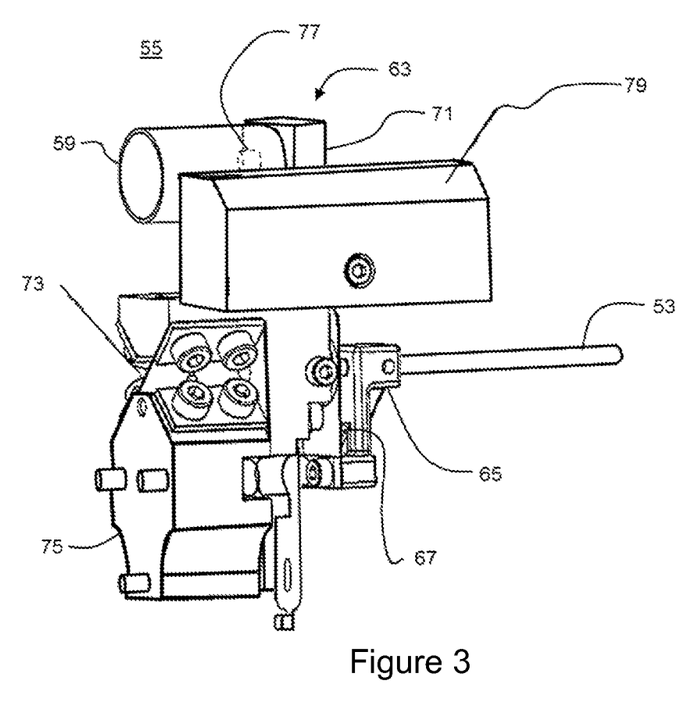
FIG. 3 is a perspective view of an illustrative embodiment of a fault indication mechanism according to one embodiment of the present invention.
Figure 4:
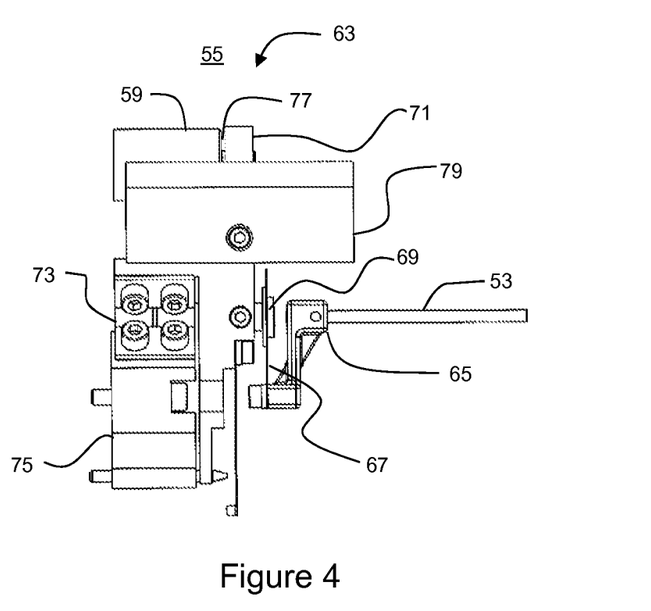
FIG. 4 is a front view of an illustrative embodiment of a fault indication mechanism according to one embodiment of the present invention.

Illustrated in FIGS. 3 and 4 is an embodiment of a sensor assembly 55. The sensor assembly 55 includes a magnet assembly 63 that is connected to the torque rod 53 by means of a coupling flange 65 and a coupling lamella or flexure 67. The lamella or flexure 67 is connected to the magnet assembly 63 by a pin 69. The magnet assembly 63 may include a beam 71 that is free to rotate about the axis of the torque rod 53. The movement of the beam 71 is constrained by a U-Flexure assembly 73 that sits on pivot 75. A magnet 77 is disposed on the beam 71, and changes in the magnetic field due to rotation of the beam 71 are detected by the non-contact sensor 59. A weight 79 is provided and attached to the beam 71. If the connection between the torque rod 53 and the beam 71 is severed, such as for example if the torque rod is detached or disconnected from the coupling flange 65, the weight 79 forces the magnet assembly 63 to rotate so that the reading of the non-contact sensor 59 falls outside of the instrument range, indicating a fault condition.

Figure 5:
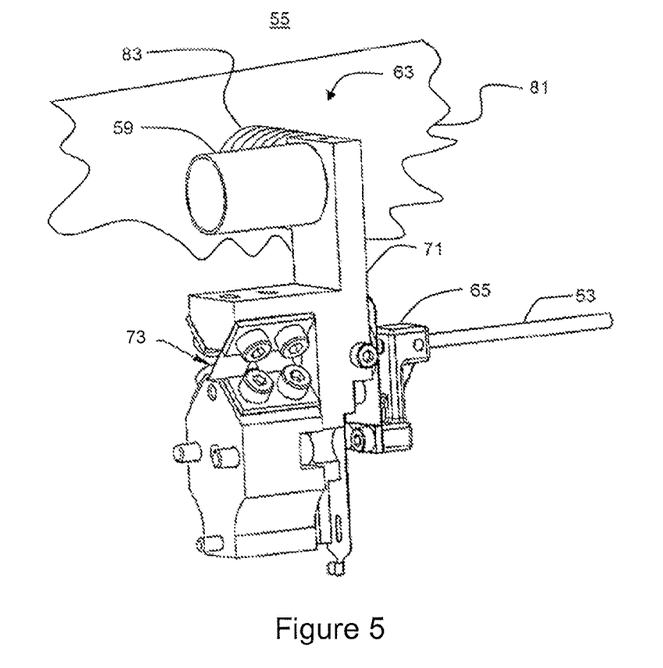
FIG. 5 is a perspective view of an illustrative embodiment of a fault indication mechanism according to one embodiment of the present invention.
Figure 6:
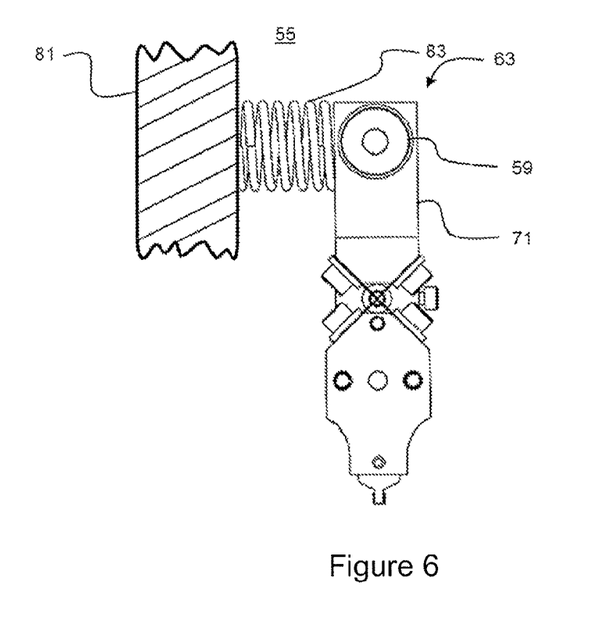
FIG. 6 is a front view of an illustrative embodiment of a fault indication mechanism according to one embodiment of the present invention.

Illustrated in FIGS. 5 and 6 is a second embodiment of a sensor assembly 55. The sensor assembly 55 is disposed in a housing with a wall 81. A compression spring 83 is secured on the wall 81 and on the beam 71. The compression spring is under compression when the sensor assembly is disposed in the housing so that if the connection between the torque rod 53 and the beam 71 is severed the compression spring 83 will exert a force on the beam 71. The force will cause the magnet assembly 63 to rotate so that the reading of the non-contact sensor 59 falls outside of the instrument range, indicating a fault condition.

Figure 7:
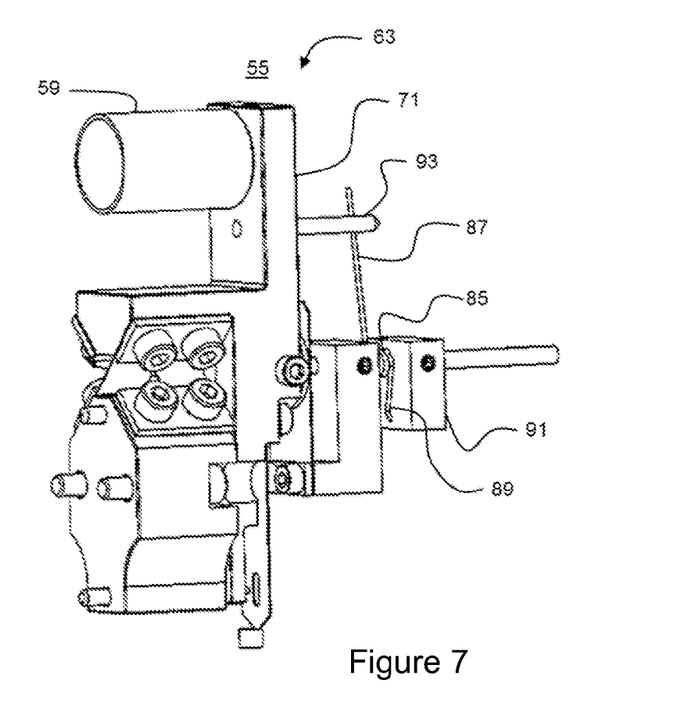
FIG. 7 represents a perspective view of an illustrative embodiment of a fault indication mechanism according to one embodiment of the present invention.
Figure 8:
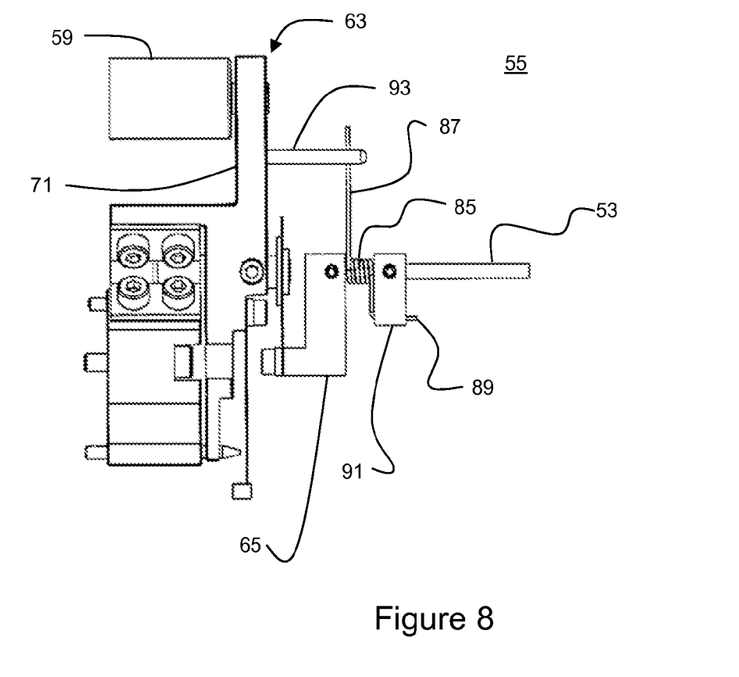
FIG. 8 is a front view of an illustrative embodiment of a fault indication mechanism according to one embodiment of the present invention.

Illustrated in FIGS. 7 and 8 is a third embodiment of a sensor assembly 55. A torsion spring 85 with a first end 87 and a second end 89 is disposed on the torque rod 53. An anchor plug 91 is secured to the torque rod 53 to provide a connection point for the second end 89 of the torsion spring 85. An anchor rod 93 is attached to the beam 71 to secure the first end of the torsion spring 85. When assembled, the torsion spring 85 is under a torsion load. If the connection between the torque rod 53 and the beam 71 is severed the torsion spring 85 will exert a force on the beam 71. The force will cause the magnet assembly 63 to rotate so that the reading of the non-contact sensor 59 falls outside of the instrument range, indicating a fault condition.

Figure 9:
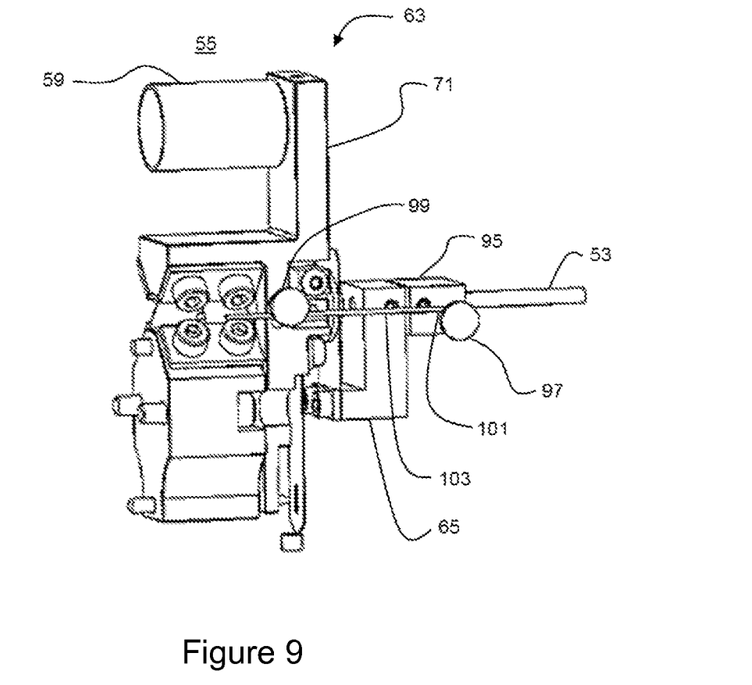
FIG. 9 represents a perspective view of an illustrative embodiment of a fault indication mechanism according to one embodiment of the present invention.
Figure 10:
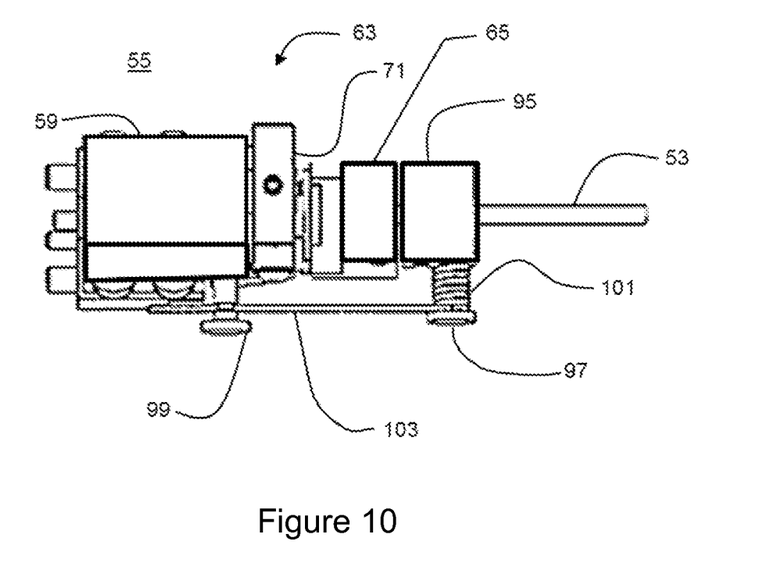
FIG. 10 is a to view of an illustrative embodiment of a fault indication mechanism according to one embodiment of the present invention.

Illustrated in FIGS. 9 and 10 is a fourth embodiment of a sensor assembly 55. An anchor block 95 is secured to the torque rod 53. A spring support 97 is secured to the anchor block 95, and a spring support 99 is secured to the beam 71. A torsion spring 101 with a spring arm 103 is disposed on the spring support 97. The spring arm 103 is placed below the spring support 99. If the connection between the torque rod 53 and the beam 71 is severed the torsion spring 101 will exert a force on the beam 71. The force will cause the magnet assembly 63 to rotate so that the reading of the non-contact sensor 59 falls outside of the instrument range, indicating a fault condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A measurement system, comprising:
   a sensing element that is configured to provide a response to a measured quantity;
   a first mechanical transducer coupled with the sensing element, the first mechanical transducer configured to provide a first output signal proportional to the measured quantity;
   a second mechanical transducer mechanically connected with the first mechanical transducer, the second mechanical transducer configured to convert the first output signal into a second output signal;
   a sensor that is configured to detect the second output signal, the sensor further configured to generate an instrument reading; and
   a bias assembly coupled with the second mechanical transducer, the bias assembly configured to force the second mechanical transducer to provide the second output signal with a value that causes the sensor to generate the instrument reading outside of a specified instrument range of output signals when the first mechanical transducer is disconnected from the second mechanical transducer.

2. The measurement system of claim 1, wherein the sensing element comprises:
   a displacer;
   an extension rod; and
   displacer hanger that is configured to couple the displacer and the extension rod.

3. The measurement system of claim 1, wherein the first mechanical transducer comprises a torque rod coupled to the sensing element.

4. The measurement system of claim 1, wherein the second mechanical transducer comprises a magnet assembly coupled to the first mechanical transducer, and wherein the magnet assembly is adapted to rotate about an axis of rotation.

5. The measurement system of claim 4, wherein the bias assembly is configured to impart moment on the magnet assembly that causes the magnet assembly to rotate about the axis of rotation.

6. The measurement system of claim 5, wherein the bias assembly comprises a weight attached to the magnet assembly.

7. The measurement system of claim 5, wherein the bias assembly comprises a compression spring attached to the magnet assembly.

8. The measurement system of claim 5, wherein the bias assembly comprises a torsion spring attached to the magnet assembly along the axis of rotation.

9. The measurement system of claim 1, wherein the sensing element is configured to move in response to a change in a level of a liquid.

10. A level detector, comprising:
    a displacer assembly;
    a torque rod coupled to the displacer assembly;
    a magnet assembly connected to the torque rod;
    a non-contact sensor that detects displacement of the magnet assembly within an instrument range; and
    a bias assembly that displaces the magnet assembly beyond the instrument range when the magnet assembly is disconnected from the torque rod.

11. The level detector of claim 10, wherein the magnet assembly comprises: a beam connected to the torque rod adapted to rotate in a plane perpendicular to an axis defined by the length of the torque rod; and a magnet disposed on the beam.

12. The level detector of claim 11, wherein the bias assembly comprises a mechanism that imparts a torque on the beam and displaces the beam beyond the instrument range when the beam is disconnected from the torque rod.

13. The level detector of claim 12, wherein the mechanism that imparts a torque comprises a weight attached to the beam.

14. The level detector of claim 12, wherein the mechanism that imparts a torque comprises a compression spring attached to the beam.

15. The level detector of claim 12, wherein the mechanism that imparts a torque comprises a torsion spring attached to the beam.

16. A sensor assembly comprising:
a mechanical energy input source;
a displaceable assembly mechanically connected to the mechanical energy input source;
a sensor that detects displacement of the displaceable assembly, the sensor configured to provide a signal proportional to the displacement;
an output indicating device coupled to the sensor, the output indicating device configured to convert the signal to an instrument reading within an instrument range; and
a bias assembly that is configured to displace the displaceable assembly beyond the instrument range when the displaceable assembly is disconnected from the mechanical energy input source,
wherein the mechanical energy input source comprises a torque provided by a torque rod.

17. The sensor assembly of claim 16, wherein the sensor is a Hall effect sensor.

18. The sensor assembly of claim 17, wherein the displaceable assembly comprises a magnet assembly that rotates about an axis.

19. The sensor assembly of claim 18, wherein the bias assembly comprises a weight attached to the magnet assembly.

20. The sensor assembly of claim 18, wherein the bias assembly comprises a compression spring attached to the magnet assembly.

21. The sensor assembly of claim 20, wherein the bias assembly comprises a torsion spring attached to the magnet assembly.

22. A system for controlling a process based on a fluid level in a vessel, said system comprising:
a process control system;
displacer assembly;
a torque rod coupled to the displacer assembly;
a magnet assembly connected to the torque rod;
a non-contact sensor that detects displacement of the magnet assembly within an instrument range;
a bias assembly that displaces the magnet assembly beyond the instrument range when the magnet assembly is disconnected from the torque rod;
a transmitter coupled to the non-contact sensor that provides an output signal proportional to the displacement of the magnet assembly to the process control system; and
a fault indicator that provides a fault signal when the magnet assembly is displaced beyond the instrument range.

23. The system of claim 22, wherein the magnet assembly comprises: a beam connected to the torque rod adapted to rotate in a plane perpendicular to an axis defined by the length of the torque rod; and a magnet disposed on the beam.

24. The system of claim 22, wherein the bias assembly comprises a mechanism that imparts a torque on the beam and displaces the beam beyond the instrument range when the beam is disconnected from the torque rod.

25. The system of claim 24, wherein the mechanism that imparts a torque comprises a weight attached to the beam.

26. The system of claim 24, wherein the mechanism that imparts a torque comprises a compression spring attached to the beam.

27. The system of claim 24, wherein the mechanism that imparts a torque comprises a torsion spring attached to the beam.

\* \* \* \* \*

UNITED STATES PATENT AND TRADEMARK OFFICE
CERTIFICATE OF CORRECTION

PATENT NO. : 8,915,134 B2  
APPLICATION NO. : 13/252865  
DATED : December 23, 2014  
INVENTOR(S) : Giovanoni et al.

Page 1 of 1

It is certified that error appears in the above-identified patent and that said Letters Patent is hereby corrected as shown below:

In the Claims

In Column 6, Line 34, in Claim 2, delete "displacer" and insert -- a displacer --, therefor.

In Column 6, Line 44, in Claim 5, delete "impart moment" and insert -- impart a moment --, therefor.

In Column 7, Line 18, in Claim 16, delete "assembly" and insert -- assembly, --, therefor.

In Column 8, Line 10, in Claim 22, delete "displacer" and insert -- a displacer --, therefor.

Signed and Sealed this  
Nineteenth Day of January, 2016

Michelle K. Lee  
*Director of the United States Patent and Trademark Office*